(No Model.) 2 Sheets—Sheet 1.

L. H. NASH.
HOT AIR AND GAS ENGINE.

No. 278,257. Patented May 22, 1883.

Witnesses:
Edmond Brodhag
Howell Bartle

Inventor:
pro Lewis Hallock Nash
Johnson & W. Johnson
Attys.

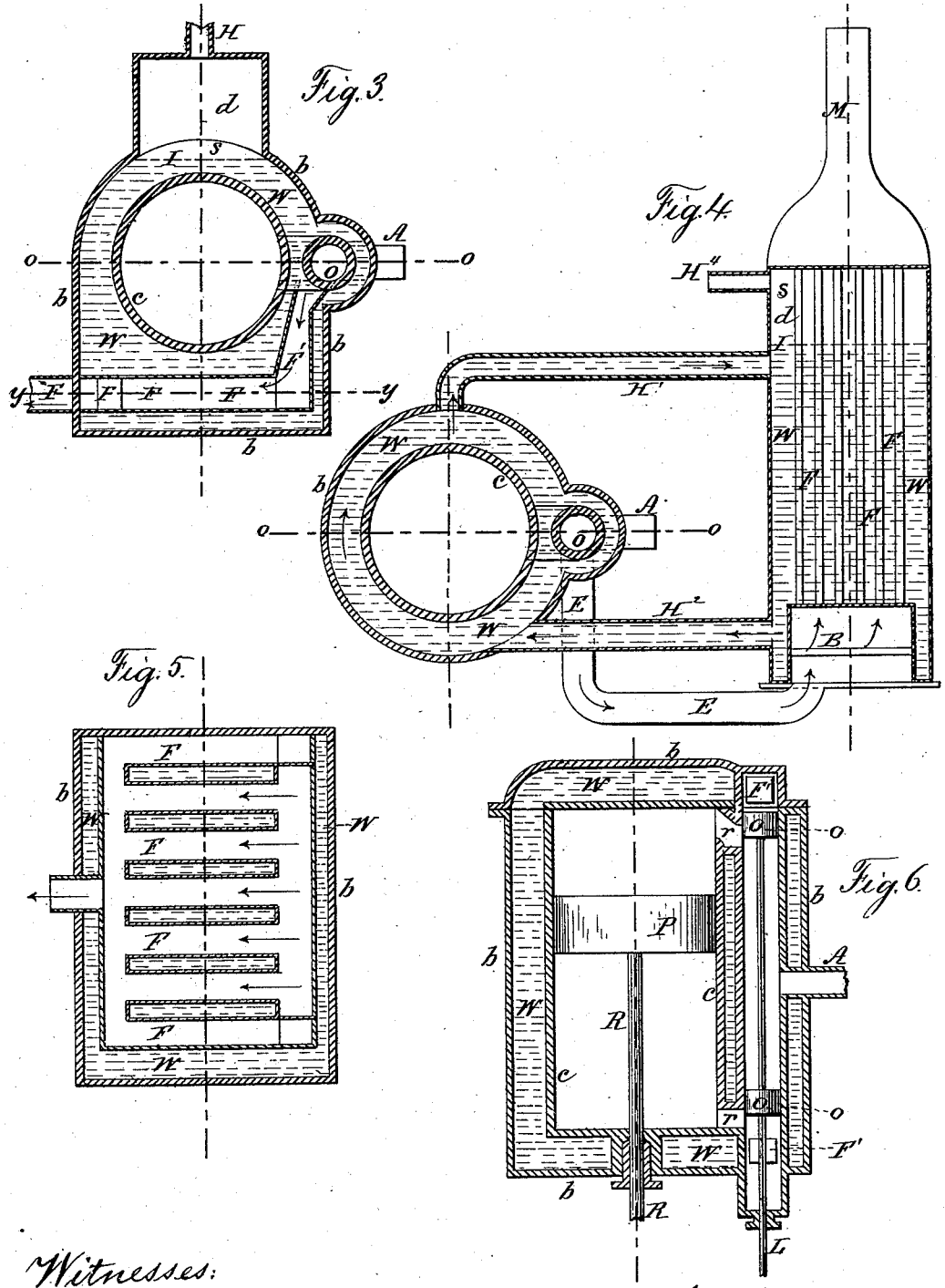

UNITED STATES PATENT OFFICE.

LEWIS H. NASH, OF BROOKLYN, ASSIGNOR TO THE NATIONAL METER COMPANY, OF NEW YORK, N. Y.

HOT-AIR AND GAS ENGINE.

SPECIFICATION forming part of Letters Patent No. 278,257, dated May 22, 1883.

Application filed June 23, 1882. (No model.)

*To all whom it may concern:*

Be it known that I, LEWIS H. NASH, a citizen of the United States, residing at Brooklyn, county of Kings, and State of New York, have invented new and useful Improvements in Hot-Air and Gas Engines, of which the following is a specification.

My invention relates to improvements in engines using an expansive mixture of gas and air for driving its piston. The gas engine is of the double-acting type, and the working-cylinder is totally enveloped by a boiler-incasement, which also envelops flues for the escape of the gases, whereby the heat of radiation and of conduction is utilized with great advantage in the development of power from the products of the combustion of the gases within the cylinder. I produce a double-acting boiler-incased explosive-gas engine of simple and compact construction, in connection with the utilization of the waste heat from the products of combustion. With such a double-acting boiler-incased gas-engine I combine an independent steam-engine operated in unison with the gas-engine by the steam generated in its boiler-incasement. The working-cylinder is not only totally enveloped by the boiler-incasement, but the valves and the flues communicating therewith for the escape of the gases, thus utilizing the entire surface of the engine for the production of heat to produce steam and to maintain a uniform temperature of the working-cylinder. I provide for still further utilizing the waste gases from the gas-engine cylinder by combining therewith and its flues an independent boiler communicating with said boiler-incasement, within which steam is generated by the heat from said waste gases.

For a more particular understanding of my invention I will now proceed to give a full description of the same, preparatory to a specific designation of the combinations of elements which constitute my claims.

Figure 1:
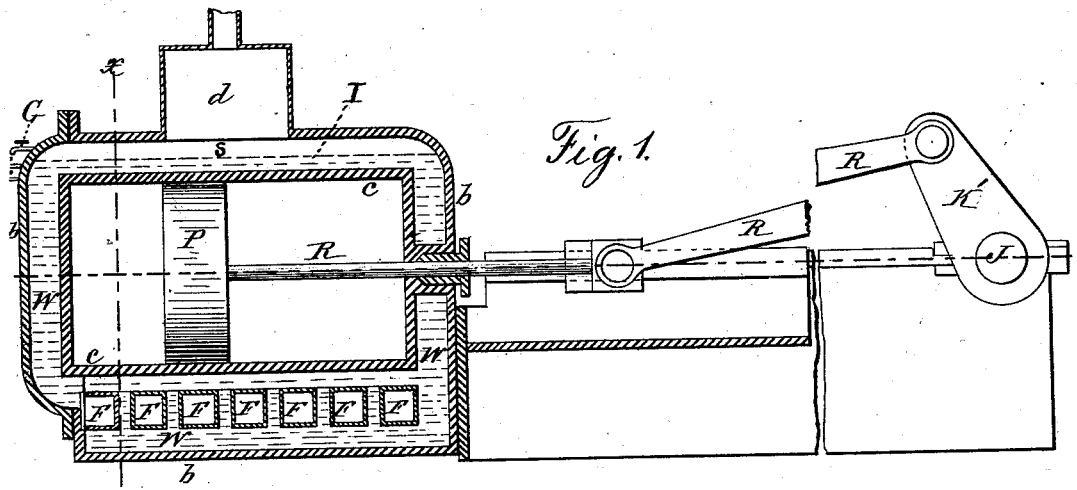
Figure 2:
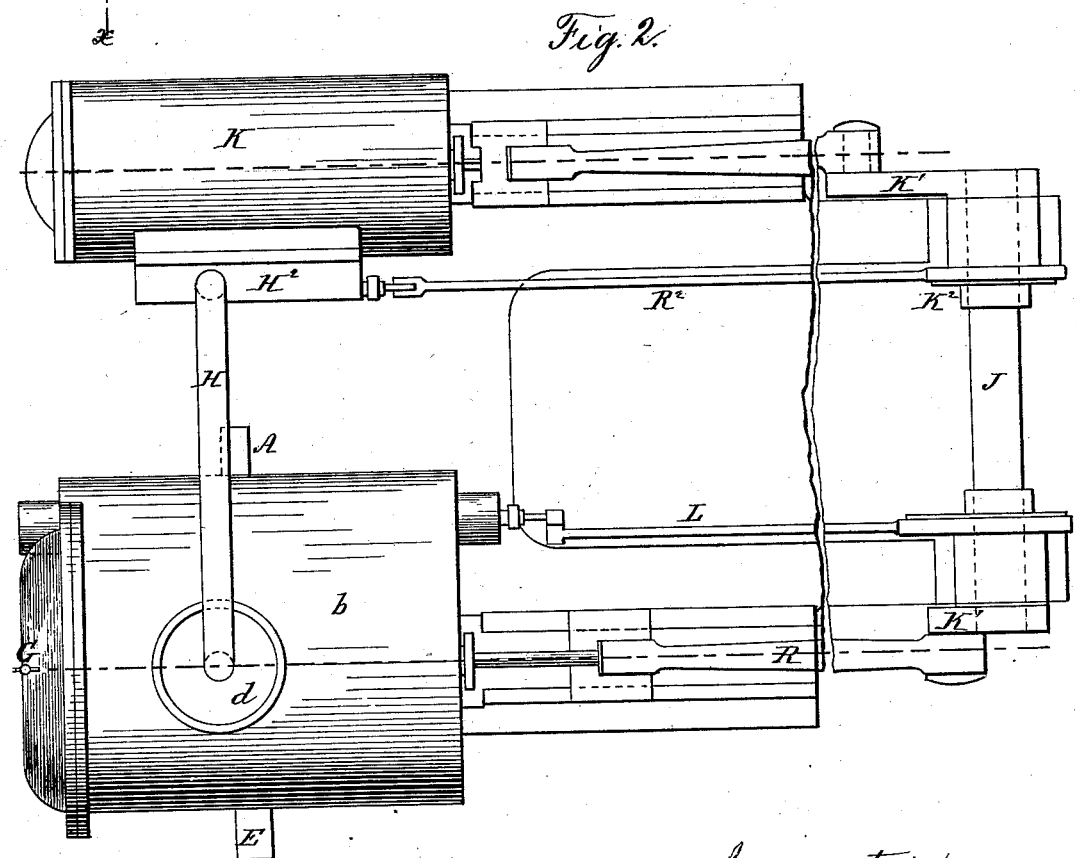

Referring to the drawings, Figure 1 represents a vertical section taken through the air-engine cylinder and its boiler-incasement; Fig. 2, a top view of the same as combined with a steam-engine; Fig. 3, a cross-section of the air-engine and its boiler-incasement, taken through the line $xx$ of Fig. 1; Fig. 4, a similar section of the air-engine and its boiler-incasement combined with a secondary steam-boiler through which the waste heat and gases from the engine are passed. These views represent horizontal engines; but my invention may be applied to engines of the vertical type as well. Fig. 5 is a horizontal section taken through the flues for the escape of the waste heat, on the line $yy$ of Fig. 3; and Fig. 6, a horizontal section taken through the valve on the line $oo$ of Fig. 3.

The heated parts of the engine are surrounded by a steam-tight casing, into which water or any liquid capable of being converted into an explosive gas or vapor is admitted, as to a steam-boiler. The casing is filled to a point where it is desired to maintain the water-level, and sufficient space is provided into which the steam can collect, as in the steam-space of a boiler, so that the steam generated can pass off dry, either by providing a steam-dome for the purpose or by taking the steam from an enlarged portion of the casing. The whole is provided with the necessary gage-cocks, feed apparatus, and other appliances necessary to a steam-boiler. The heat radiated and conducted through the walls of the air or gas engine is communicated to the water or steam within the incasement, and thus produces steam therein. The waste gases of the engine are also caused to pass over boiler-surfaces, either in the incasement of the engine or within a boiler constructed to receive them, the water-space of which communicates with the water-space of the engine-boiler. The power thus developed in the primary boiler is utilized in a steam-engine of any approved style, which may be coupled directly to the hot-air engine and assist its developing-power; or it may run independently and do other work; or the steam may be used for heating the building, or any other purpose. In the construction shown the gases from the engine pass through flues in its incasement into a separate boiler, which may connect with and drive the steam-engine shown in Fig. 2 as coupled with the hot-air engine. The advantages of this combination, in addition to the gain of power derived from the engine-incasement, is that the steam-engine is always in readiness to start the combined engines, since there will always be a reserve of power in the engine-incasement to start the engine when only stopped for a short time. Inasmuch as the hot-air or gas engine requires to be in motion before it can begin to develop power, the advantage of the combined engines is important in large engines, or in marine engines, which it is frequently necessary to stop and to start. In order to start the engine at any time, a secondary source of heat may be applied to the engine-boiler, so as to raise steam to a pressure required to start the engine. In large engines I prefer to do this as follows:

A secondary boiler is provided with suitable connections for attaching it to the boiler surrounding the engine. Heat from fuel is applied to this secondary boiler until the steam-pressure becomes great enough to start the engine, the water in the engine-incasement being also heated by the steam generated in the secondary boiler. The starting is then made by turning on the steam to the steam-engine, and as soon as the hot-air engine has started it also will begin to develop power. The waste gas from the boiler-engine can now be turned into the secondary boiler, and is the only fuel then used therein to continue the production of steam, unless the combined engines should be stopped for so long a time as to allow the engine-casing to cool off to such an extent that the steam-pressure would fall too low to start the engine; but the steam-pressure can always be kept up by using fuel in the secondary boiler whenever the engine is stopped.
When the waste gases from the engine are passed through flues of the engine-incasement, and it is not desired to pass them through a secondary boiler, I maintain the secondary boiler as a starter by using solid or liquid fuel, and when the engine is running the steam so generated can be used in connection with the steam generated in the engine-incasement to run the steam-engine; or the supply of fuel may be only sufficient to produce steam-pressure to start the gas-engine at any time.

The advantages of the combined engines and boilers are that, all the heated parts of the engine being surrounded by the boiler-casing, the temperature of the hot-air or gas engine is not allowed to rise above that of a steam-engine using steam at a pressure as high as that maintained in the boiler-incasement; hence ordinary lubricating-oils can be used in the working-cylinder, and in properly-proportioned engines the steam-engine will develop from one-third to one-fifth the power of the hot-air or gas engine. As this additional power is obtained without loss to the efficiency of the gas-engine and without any additional expenditure of fuel, it will be seen that these advantages are important in the conjoint working of gas and steam engines.

In small engines I prefer to cast the incasement with the castings of the engine, as shown in the drawings; but for large engines I prefer to surround the engine with a boiler-shell of sheet metal secured to the castings of the engine in such a manner as would be determined by the judgment of a good boiler-maker.

In Fig. 1 the engine-cylinder $c$ is shown with its piston P and piston-rod connections and the casing $b$ completely enveloping the cylinder, so as to form a surrounding space for the water, which is indicated by W, and is maintained at a level, I, therein to envelop the cylinder and leave a steam-space, $s$, at the top of the casing communicating with a dome, $d$, within which the steam collects. The piston-rod passes through one end of the cylinder and its casing by a stuffing-box connection. Any suitable feed-water connections may be made with casing which is provided with suitable steam and water try-cocks, G, preferably arranged in the casing $b$, at one end of the cylinder. The waste gases, after being discharged from the cylinder, pass through flues F, arranged within the water-space, preferably at the lower side of the cylinder, where the casing is enlarged for this purpose, as shown in Figs. 1, 3, and 5, and escape at some portion of the casing, as at E.

A represents the pipe through which the air and combustible gases are introduced into the cylinder through a proper valve, $o$, working in a suitable case or cylinder by a rod, L, and crank K' on the crank-shaft J, which also connects with the piston P by the pitman-rod R and crank K'. (Shown in Fig. 2.) In this figure I have shown a steam-engine, K, co-operating with the gas-engine by means of the pipe H, connecting the steam-dome $d$ of the gas-engine boiler-incasement with the valve-chest $H^2$ of the steam-engine, the piston of which is operated from the shaft J by the pitman-rod $R^2$ and eccentric $K^2$, so that the valves of both engines are operated from the same crank-shaft. This combination is only used when it is desired to run a steam-engine and a gas or hot-air engine together, as stated.

In Fig. 4 the cylinder of a hot-air or gas engine is shown as enveloped by a boiler-incasement, in which the hot waste gases are discharged directly from the cylinder into a pipe, E, leading to a secondary vertical tubular or other boiler, where they serve as fuel in the production of steam in passing through the tube F of said boiler into the stack M. In this combination of vertical boiler and horizontal boiler-incased engine the steam dome or space $d$ must be above the water-level in the boiler-incased engine, and the water-spaces W of both boilers are connected by means of pipes H' $H^2$, so as to keep up a circulation of water and steam from one to the other, as shown by the arrows.
Hence it will be seen that the cylinder is prevented from being too greatly heated by the circulation of water around through the cylinder-casing, the mixed steam and water passing through pipe H' and the steam collecting in dome $d$. In this construction it is only necessary to provide for a free circulation around the engine-cylinder and its heads, as the steam collects in the secondary boiler, which, as shown, has a grate, B, upon which a fire of solid fuel can be made to start the engine, as stated; or, if desired, liquid fuel can be passed in through tubes at B in the same manner as liquid fuel is supplied to steam-boilers. In this plan the boiler-incasement of the engine is not connected with the steam-engine, but the secondary boiler is so connected by the pipe $H^4$ to operate the steam-engine; or the steam generated by both boilers may be used for any other purpose, as for heating buildings.

In the employment of the two boilers, as shown in Fig. 4, the engine-boiler incasement need not be so large as in the form shown in Fig. 1, and the incasement of the engine practically constitutes a branch of the boiler in which the steam collects.

The mixture of gas and air is admitted to the engine and ignited in any of the well-known ways in gas-engines, so as to utilize its expansive force to drive the piston. The cylinder-walls take up a portion of the heat from the hot gases and communicate it to the surrounding water, developing steam. To this utilization of the heat of radiation and conduction I add the heat of the waste gases from the engine by conducting them through flues F, passing through the lower portion of the incasement, and giving up the heat to the water through the flue-walls, and thus aid in the generation of steam, which, collecting in the steam-dome, passes by the pipe H into and operates the steam-engine, and thereby communicate the power of the joint action of both engines to the power-transmitting shaft.

I have shown the waste gases as passing through a system of flues within the boiler-casing; but the gases may be passed into a chamber containing a system of tubes, as in any approved form of tubular boiler.

The boiler-case which envelops the engine-cylinder also envelops the cylinder within which the valve o operates, the valve-cylinder being mounted within the casing, so that its surface gives out the heat it receives from the gases and the valve is kept free from being too greatly heated. A valve thus arranged is shown in Fig. 6 in connection with ports $r\ r$, communicating with the cylinder c, and the passage $F'$, communicating with the flues F for the escape of hot gases from the cylinder; but any other suitable form of valve may be used in connection with any suitable arrangement of ports and flues for the hot gases.

The piston-rod of the gas-engine may be connected with one shaft and the piston-rod of the steam-engine with another, and thus operate different machines.

I claim—

1. The combination substantially herein described of an air, gas, or liquid-fuel double-acting explosive engine, with a boiler-incasement totally enveloping the working-cylinder, in which the water is heated by the gas-engine, and flues communicating with the valve-chamber of the engine passing through said boiler-incasement, for the purpose specified.

2. The boiler-incased double-acting explosive engine herein described, having the working-cylinder, the valves, and the flues for the escape of the waste gases totally enveloped by the said boiler-incasement, substantially as described, for the purpose specified.

3. The combination, substantially herein set forth, of a gas-engine in which the piston is operated through its stroke by the expansive force of a charge of combustible mixture ignited within said cylinder, a boiler-incasement for the same flues for the escape of the waste gases, and an independent steam-engine operated by steam from said boiler-incasement and co-operating with said gas-engine in developing power.

4. The combination substantially herein described of an air, gas, or liquid-fuel engine with a boiler-incasement for said engine, flues for conducting the waste gases from the engine-cylinder, and a valve, also enveloped by said engine-boiler incasement, for the purpose specified.

5. The combination substantially herein described of an air, gas, or liquid-fuel engine with a boiler-incasement for said engine, flues for conducting the waste gases from the engine-cylinder, and a secondary boiler adapted to receive the waste gases from the engine and to communicate with the water-space of its boiler-incasement, for the purpose set forth.

6. The combination substantially herein set forth of an air, gas, or liquid-fuel engine with a boiler-incasement for said engine, flues for conducting the waste gases from the engine-cylinder, a secondary boiler adapted to receive the waste gases from the engine and to communicate with the water-space of said boiler-incasement, and the steam-engine connected with the steam-chamber of said secondary boiler, for the purpose specified.

In testimony whereof I have hereunto set my hand in the presence of two subscribing witnesses.

LEWIS HALLOCK NASH.

Witnesses:
WILLIAM M. BROWN,
HORACE R. NASH.